United States Patent [19]
Berger

[11] 4,182,268
[45] Jan. 8, 1980

[54] BREEDING OF AQUATIC ANIMALS IN A CONTROLLED ENVIRONMENT

[75] Inventor: Michael Berger, Pullach, Fed. Rep. of Germany

[73] Assignee: Linde Aktiengesellschaft, Wiesbaden, Fed. Rep. of Germany

[21] Appl. No.: 826,599

[22] Filed: Aug. 22, 1977

[30] Foreign Application Priority Data

Aug. 26, 1976 [DE] Fed. Rep. of Germany ....... 2638489

[51] Int. Cl.$^2$ .............................................. A01K 63/00
[52] U.S. Cl. ....................................................... 119/3
[58] Field of Search .................... 119/3, 4, 5; 261/122, 261/124; 55/223

[56] References Cited

U.S. PATENT DOCUMENTS

| | | | |
|---|---|---|---|
| 2,242,429 | 5/1941 | Johnson | 261/124 X |
| 2,869,844 | 1/1959 | Thomas | 261/124 X |
| 3,711,330 | 1/1973 | Kierce | 261/124 X |
| 3,799,511 | 3/1974 | Svantesson | 261/124 X |
| 4,030,450 | 6/1977 | Hoult | 119/3 |

FOREIGN PATENT DOCUMENTS

2110091 9/1971 Fed. Rep. of Germany .............. 119/3
2602181 7/1976 Fed. Rep. of Germany .............. 119/3

Primary Examiner—Russell R. Kinsey
Assistant Examiner—Robert P. Swiatek
Attorney, Agent, or Firm—Millen & White

[57] ABSTRACT

In a process for breeding aquatic animals in a controlled environment wherein the aquatic animals are maintained in water reservoirs open to the atmosphere and which have fresh water introduced and fecal waste containing water discharged, and wherein the oxygen content of the water present in the water reservoirs is kept at a value corresponding to desirable growing conditions for the aquatic animals by the introduction of a gas consisting essentially of oxygen or oxygen-enriched air, the improvement which comprises introducing the gas into the zone underneath and/or above the water level of at least one bell partially immersed in the water, feeding water to the lid zone of said bell, distributing the water into a plurality of partial streams of water, passing the streams of water from the lid zone of said bell downwardly inside said bell in counter current contact to said gas, and withdrawing residual gas from said bell.

13 Claims, 3 Drawing Figures

BREEDING OF AQUATIC ANIMALS IN A CONTROLLED ENVIRONMENT

BACKGROUND OF THE INVENTION

This invention relates to a process for the breeding of aquatic animals in a controlled environment wherein the aquatic animals are maintained in water reservoirs which are open only to the atmosphere and which have water flowing therethrough constantly or intermittently, and wherein the oxygen content of the water present in the water reservoirs is kept at a value corresponding to the optimum rearing conditions for the aquatic animals by the introduction of a gas consisting essentially of oxygen or oxygen-enriched air.

A process for fish farming has been known from DOS [German Unexamined Laid-Open Application] No. 2,110,091 wherein oxygen-enriched water, pumped preferably from a spring or from a well, is conducted continuously from the bottom toward the top through a vertically disposed container constituting the living space for the fish and, in order to attain optimum rearing conditions, oxygen or an oxygen-containing gas is fed into the container from the bottom.

The water current, oriented from the bottom toward the top in the container serves, in this system, for discharging the metabolic wastes produced by the fish, or other waste matter, with the overflow water discharged at the top edge of the container. To be able to maintain this flow direction of the water at all times, it is consequently necessary to introduce also the gas to be fed for the oxygen enrichment of the water always in the same flow direction as the water into the container.

However, as a consequence thereof, this process operates uneconomically with respect to the utilization of the thus-introduced oxygen. This is so, because due to the same flow direction of water and gas, the residence time of the thus-fed oxygen bubbles within the water, which residence time is additionally dependent on the flow velocity of the water and of the gas required to discharge the metabolic wastes, is too short along the dissolution distance predetermined by the height of the container to permit the complete dissolution of such bubbles. Accordingly, undissolved oxygen escapes into the atmosphere at the top edge of the container. Furthermore, it is impossible to provide a higher oxygen content in the water, which becomes necessary with the increasing growth of the fish, by the introduction of an arbitrarily larger oxygen stream. Apart from the fact that the oxygen utilization in such a case is even less than before, an increased oxygen stream leads to turbulent water currents within the container, resulting in a dropping of the fecal waste to the bottom of the container in opposition to the water current. As a consequence, the oxygen feed means are clogged up, on the one hand, and poisoning phenomena occur in the fish and the flavor of the fish is impaired, on the other hand.

SUMMARY OF THE INVENTION

An object of this invention is to provide an improved system for the breeding of aquatic animals of the type described hereinabove which makes it possible, without any special technical measures, to introduce a gas consisting essentially of oxygen or oxygen-enriched air into the water present in the water reservoir with a high oxygen feed rate.

Another object is to provide an easily controllable metering system for the feed oxygen.

Further objects are to provide a system having a low energy requirement and an improved utilization of the oxygen.

Upon further study of the specification and appended claims, further objects and advantages of this invention will become apparent to those skilled in the art.

To attain these objects, the gas is fed into the zone underneath and/or above the water level of at least one hood-like structure (hereinafter termed a "bell"), partially immersed in the water reservoir. Thus, a portion of the bell, including its cover, extends above the level of the water reservoir. Water is conducted to said extended portion underneath the cover thereof and distributed into a plurality of partial streams; which fall by gravity or under pressure into the water. Residual gas collected in the upper portion of the bell is discharged.

In this way, if the gas is introduced underneath the water level the gas is brought into contact with the water in two successive enrichment zones. The gas undissolved in the first enrichment zone between the gas distribution system and the water level rises subsequently into the gas space of the bell above the water level forming the second enrichment zone. Since the water flows through this enrichment zone while subdivided into a plurality of partial streams, the contact surface area between the water and the gas is relatively large; consequently a portion of the gas is directly dissolved in the water of the partial streams. However, in part, the gas is also entrained again by the water streams into the first enrichment zone and dissolved therein. If the gas is introduced above the water level, a portion of the gas is directly dissolved in the water of the partial streams, while a main portion of the gas is dissolved in or immediately beneath its surface, because the gas is dragged along with the droplets penetrating into the surface.

In this connection, it is advantageous to re-feed to the bell at least partially water which has been taken from the water reservoir. This ensures that, independently of the water constantly conducted to the water reservoir by way of the bell from the outside, there will always be sufficient water available to be subdivided underneath the cover of the bell into partial streams, thus enhancing the oxygen enrichment. This is so, because the amount of water to be fed from the outside to the water reservoir is dependent on the stream of water discharged from the water reservoir required from removing the metabolic wastes of the aquatic animals via the discharge means of the water reservoir. Depending on the density of the aquatic animals maintained in the water reservoir, however, the thus-discharged stream of water will vary, and this stream should not be larger than absolutely necessary to provide for an economical operation.

According to a further aspect of the present invention, an extensive oxygen utilization can be attained additionally by at least partially throttling the stream of residual gas withdrawn from the bell and maintaining the bell during this step at the same level. The pressure increase thus obtained underneath the bell improves the oxygen enrichment efficiency in the two enrichment zones considerably. It is thus contemplated the gas pressure inside the bell will be in the range of 1 bar to 3 bar, preferably 1 bar to 1.2 bar.

Furthermore, the oxygen present in the withdrawn residual gas stream can be utilized by reusing the residual gas stream after an optional cleansing from deleterious substances. Advantageously, the withdrawn residual gas stream can be admixed at least in part to the water fed to the bell or it can be fed in the zone of a further bell underneath or above the water level. By combining the features of throttling and reuse of the residual gas stream, the oxygen feed rate as well as the oxygen exploitation can thus be optimized and accordingly an extremely economical operation can be attained.

An apparatus for conducting the process of this invention comprises a water reservoir and a gas supply unit wherein advantageously at least one bell, only partially immersed in the water, is arranged in the water reservoir; a gas distribution system is installed in the zone of the bell underneath and/or above the water level, this system being in communication with a gas supply unit; a liquid distribution system is attached underneath the lid of the bell, this distribution system being connected to a water feed means; and wherein at least one gas discharge connection pipe is arranged on the lid of the bell.

In dependence on the required amount of oxygen, which is dependent, in turn, on the size and number of water reservoirs to be supplied, the gas supply unit can consist of a commercial oxygen bottle, a bundle or nest of oxygen bottles, or a tank for liquid oxygen. Such a latter tank for liquid oxygen is especially advantageous if one or more fish ponds are provided as the water reservoirs. Almost any conventional device suitable for this purpose can be utilized as the gas distribution system, for example a porous filter plate or also simply a perforated rubber hose. Also, a great variety of devices can be utilized for the liquid distribution system, such as, for example, a trough with a toothed rake or a perforated pipe.

To be able to reintroduce into the bell, water at least in part withdrawn from the water reservoir, an advantageous embodiment of the apparatus provides that the water feed means of the liquid distribution system is in communication with the water reservoir by way of a pump. It is possible, for example, in case of smaller, artificial fish breeding tanks, to connect the water feed means by way of the pump to the water discharge drain of the fish breeding tank or, in case of larger, natural fish ponds, the water feed means can be fashioned as a dip pipe.

In accordance with another advantageous embodiment, for the purpose of reusing the residual gas collecting underneath the bell, the lid of the bell is provided with a first gas discharge pipe in communication with the suction side of the pump installed in the water feed line. Thereby, the residual gas is intermixed intensively with the water fed to the liquid distribution system of the bell, and an additional enrichment is thus obtained. A second gas discharge pipe in the lid of the bell is advantageously provided with a throttle valve so that, by throttling the residual gas stream escaping via this gas discharge pipe, the operating pressure underneath the bell and thus the oxygen enrichment efficiency can be increased. To be able to exploit, moreover, also the oxygen content of this residual gas stream, the second gas discharge pipe is connected to the gas distribution system of a further bell.

The oxygen feed rate can thus be controlled by way of the amount of oxygen introduced, by the pump conveying efficiency, and by the throttling of the residual gas stream.

It is furthermore particularly advantageous to equip the bell with floats and to arrange the pump of the water feed means as well as the gas supply unit on the lid of the bell. This construction makes it possible to utilize the device also for supplying oxygen to large fish ponds.

In this connection, it is possible to control the amount of oxygen introduced via a valve arranged in the gas feed line from the gas supply unit to the gas distribution system; this valve is controlled by way of a float switch arranged within the bell. If the water level within the bell drops to a certain value on account of the pressure buildup effected by the residual gas throttling underneath the bell, this pressure buildup being additionally dependent on the pressure available due to the gas supply unit, then the valve is closed until, after a pressure lowering has occurred, the water level rises and thus the float switch opens the valve once again.

The oxygen partial pressure and the working pressure, respectively, and consequently the feed rate of the enriching system are controlled by the throttling of the residual gas. So the feed rate can be adapted to the demands by means of the gas pressure. A certain gas pressure corresponds to a certain volume of gas. That means that all the water fed into the system by means of the liquid distribution system is drawn off quantitatively from the bottom edge of the bell after having passed the gaseous space.

These illustrated imbodiments constitute the best modes known to the inventor.

DETAILED DESCRIPTION OF BEST MODES

Figure 1:
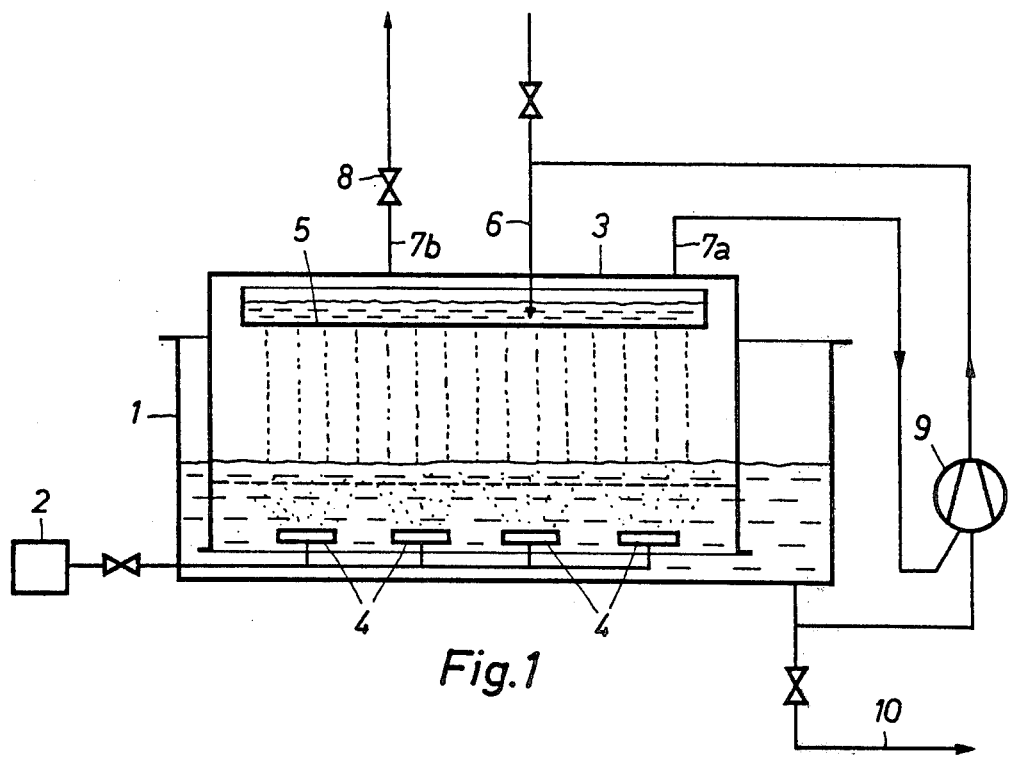
FIG. 1 shows a fish breeding tank with a fixedly installed bell.
Figure 2:
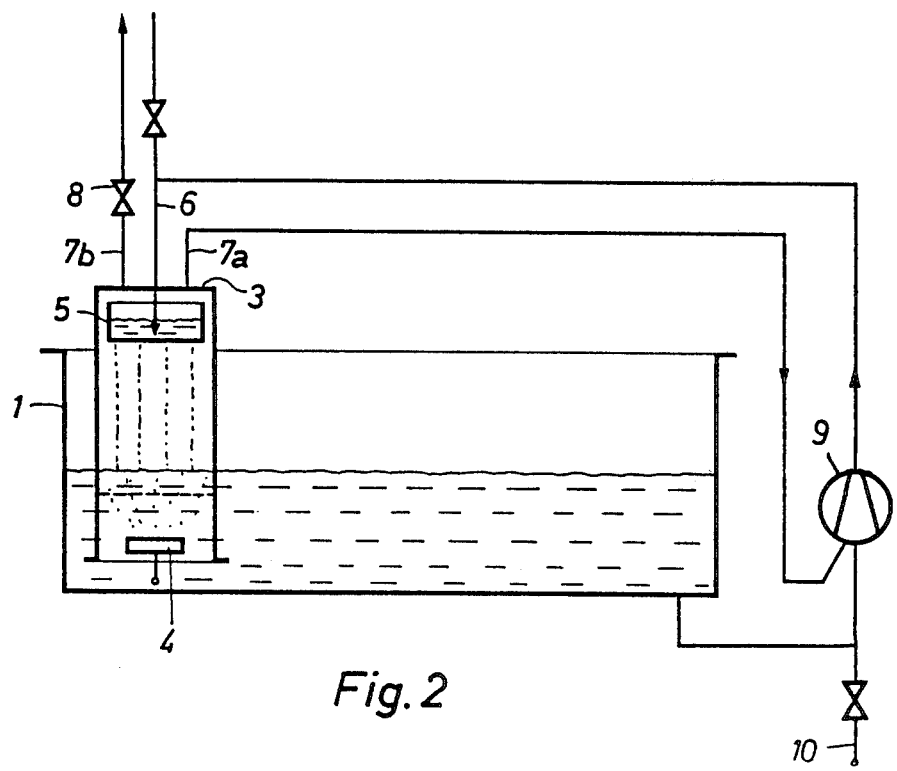
FIG. 2 is a lateral view of FIG. 1.

In FIGS. 1 and 2, a fish breeding tank 1 is illustrated as the water reservoir, which can be of a round or angular configuration, depending on the given conditions. In this fish breeding tank 1, a bell 3 adapted in its external shape to the configuration of the fish breeding tank 1 is fixedly installed so that it is only partially immersed in the existing water. The periphery of the bell 3 covers only a small portion of the water surface of the fish breeding tank 1.

In the zone of the bell 3, a gas distribution system 4 is arranged closely above the bottom of the fish breeding tank 1; this gas distribution system is in communication with a gas supply unit 2 disposed outside of the fish breeding tank 1 and can consist, for example, of a porous plate or a perforated rubber hose. Depending on the amount of oxygen required, the gas supply unit 2 can be provided in the form of an oxygen bottle, a group of oxygen bottles, or also a tank for liquid oxygen, for example in case several fish breeding tanks must be supplied simultaneously.

Underneath the lid of the bell 3, a liquid distribution system 5 is installed to subdivide the water fed to the bell 3 into many partial streams; this system can be in the form of a trough with toothed rakes or also in the form of a perforated pipe. By way of a water feed means 6, this liquid distribution system 5 is in communication, on the one hand, with the water feed means and, on the other hand, via a pump 9 with the water discharge means of the fish breeding tank 1. A branch conduit 10 of the water discharge means with a control valve serves for discharging the metabolic wastes of the aquatic animals produced in the fish breeding tank 1.

Accordingly, two enrichment zones have been formed underneath the bell 3. The gas fed via the gas distribution system 4 is initially dissolved, in part, within the water zone present above the gas distribution system 4. Gas which remains undissolved rises into the gas space of the bell 3 above the water level. In this gas space, the gas is dissolved partially directly in the water streams or jets flowing through this second enrichment zone or it is entrained and fed back to the first enrichment zone by these water streams.

The gas undissolved in these two enrichment zones can be fed, in part, via a first gas discharge pipe 7a in the lid of the bell 3 to the intake side of the pump 9 provided in the water feed line from the water discharge of the fish rearing tank 1 to the liquid distribution system 5, so that a third enrichment zone is obtained in this way. By means of a second gas discharge pipe 7b in the lid of the bell 3, the residual gas which has remained undissolved in the aforedescribed three enrichment zones can be withdrawn. In this arrangement, by way of a throttle valve 8 in the second gas discharge pipe 7b, the operating pressure underneath the bell 3 and thus the oxygen feed rate can be increased. In case the oxygen content in the residual gas stream is sufficient, the latter can then be fed to a gas distribution system of another bell.

The pressure buildup underneath the bell 3 is provided, in the final analysis, by the oxygen pressure available from the gas supply unit 2. However, the feed rate can be controlled by the amount of oxygen introduced, by the pump conveying efficiency, and by the residual gas throttling action.

Figure 3:
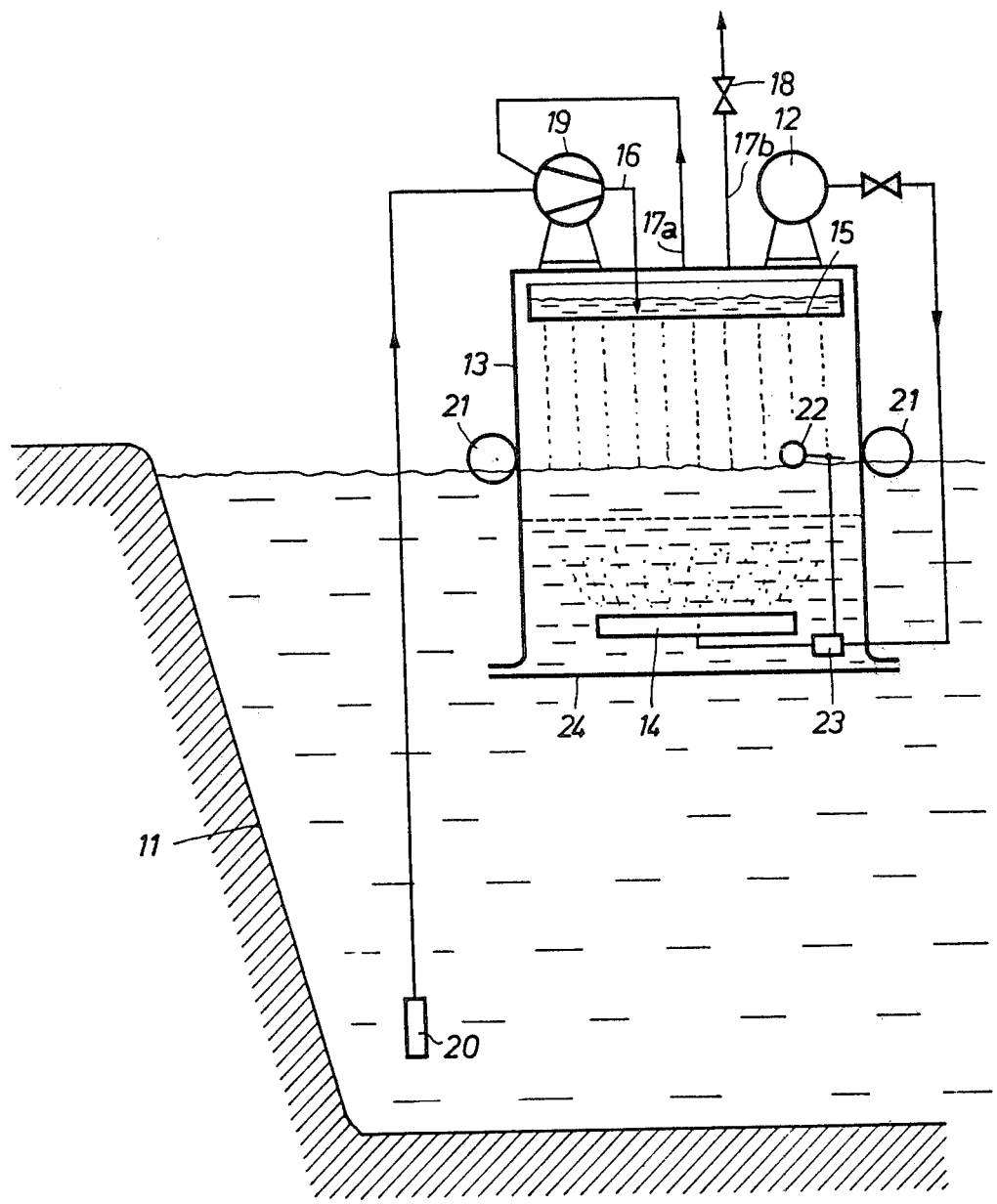
FIG. 3 shows a fish pond with a bell designed as an independent self-contained unit and mounted on floats.

As contrasted to FIGS. 1 and 2, FIG. 3 shows a floatable bell 13 fashioned as an independent unit intended for use in larger fish ponds 11. To prevent the aquatic animals from gathering underneath the bell 13 in the gasification zone, the bell 13 is closed off in the downward direction by a bottom 24 which, however, is disposed at such a distance from the sidewalls of the bell 13 that there remains merely an annular gap between the bottom 24 and the sidewalls to allow the oxygen-enriched water to escape. On the lid of the bell 13, a pump 19 as well as a gas supply unit 12 are installed. The pump 19 conveys water from the depth of the fish pond via a water feed line 16 provided at the end with a suction basket 20 into the liquid distribution system 15 arranged underneath the lid of the bell 13. To control the amount of oxygen introduced from the gas supply unit 12 into the gas supply system 14, a valve 23 is arranged in the corresponding gas feed line; this valve is controlled by way of a float switch 22 in dependence on the pressure ambient underneath the bell 13. (The suction basket 20 may be a perforated enlarged section of the pipe which prevents the fishes from entering, but permits the water to be taken up.)

In a specific example the water reservoir contained 20 m³ of water having a level of 1 m (meter). In the reservoir there was a bell having a length of 4 m, a height of 1 m and a breadth of 0.3 m fixedly installed just above the bottom of the water reservoir. With the help of a pump 50 m³ of water per hour were fed from the reservoir into the bell and there divided into approximately 400 partial streams. The working pressure was adjusted to approximately 1.07 bar by throttling the residual gas, thereby lowering the water level to 0.3 m from the bottom of the reservoir. By means of a gas distribution system arranged approximately 25 cm above the bottom edge of the bell 0.66 kg of technical oxygen were fed in per hour. The oxygen concentration in the gaseous space within the bell amounted to 80% by volume. The oxygen concentration of the water emerging from the bottom edge of the bell amounted to 22 mg oxygen per liter at a temperature of 16° C. Due to an intimate mixture of the oxygen enriched water and the remainder of the water in the water reservoir and in consideration of the oxygen consumption of approximately 2000 kg of aquatic animals the water assumed a homogeneous oxygen concentration of 12 mg oxygen per liter of water. With this oxygen concentration the water drawn off from the water reservoir was fed into the bell via the pump. Summarizing 0.5 kg oxygen per hour out of 0.6 kg oxygen per hour were dissolved in the water within the bell, corresponding to an efficiency of 83%.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modification of the invention to adapt it to various usages and conditions.

What is claimed is:

1. In a process for breeding aquatic animals in a controlled environment wherein the aquatic animals are maintained in a water reservoir open to the atmosphere and which has fresh water introduced and fecal waste containing water discharged, and wherein the oxygen content of the water present in the water reservoir is kept at a value corresponding to desirable growing conditions for the aquatic animals by the introduction of a gas consisting essentially of oxygen or oxygen-enriched air, the improvement which comprises introducing the gas directly into at least one bell partially immersed in the water, the point of introduction of the gas within the bell being under and/or above the water level therein, feeding water to the lid zone of said bell, said last mentioned water being derived at least in part from water withdrawn from the water reservoir, distributing the water into a plurality of partial streams of water, passing the stream of water from the lid zone of said bell downwardly inside said bell in counter current contact to said gas to obtain oxygen-enriched water, withdrawing residual gas from said bell, and drawing off the resultant oxygen-enriched water from the bottom of the bell so as to mix directly with the water in the reservoir.

2. A process according to claim 1, wherein the thus-withdrawn residual gas stream is at least partially throttled, and the bell is maintained at the same liquid level during this procedure.

3. A process according to claim 1, wherein the thus-withdrawn residual gas stream is admixed at least in part to the water fed to the bell.

4. A process according to claim 1, wherein the thus-withdrawn residual gas stream is introduced at least partially into the zone of a further bell underneath and/or above the water level.

5. A process according to claim 1 wherein at least one point of introduction of the gas within the bell is above the water level therein.

6. Apparatus for breeding aquatic animals, comprising a water reservoir, a gas supply means (2, 12), at least one bell (3, 13) for being immersed partially in the water of the water reservoir (1, 11); a gas distribution system (4, 14) disposed within the confines of the bell (3, 13), said gas distribution system being in communication with said gas supply means (2, 12); a liquid distribution system (5, 15) mounted underneath the lid of the bell (3, 13), said liquid distribution system being in communication with a water feed means (6, 16), said water feed means further comprising water recycle means; and at least one gas discharge pipe (7, 17) is arranged on the lid of the bell (3, 13).

7. Apparatus according to claim 6, wherein said water feed means (6, 16) is in communication, by way of a pump (9, 19), with the water reservoir (1, 11).

8. Apparatus according to claim 7, wherein a first gas discharge pipe (7a, 17a) is in communication with the intake side of the pump (9, 19).

9. Apparatus according to claim 6, wherein a second gas discharge pipe (7b, 17b) comprises a throttle valve (8, 18).

10. Apparatus according to claim 9, wherein a second gas discharge pipe (7b, 17b) is in communication with a gas distribution system of a further bell.

11. Apparatus according to claim 6, said bell (13) being equipped with floats (21); and a pump (19) for feeding water from the reservoir to the water feed means, and the gas supply unit (12) being mounted to the lid of the bell (13).

12. Apparatus according to claim 11, further comprising a valve (23) controlled by way of a float switch (22) disposed within the bell (13) and being arranged in the gas feed line from the gas supply unit (12) to the gas distribution system (14).

13. Apparatus according to claim 6 wherein the bell comprises a bottom partition closing off the bottom of said bell, said partition and the sidewall of said bell defining an annular gap permitting oxygen-enriched water to escape.

* * * * *